(12) United States Patent
Jerrard-Dunne

(10) Patent No.: US 7,840,707 B2
(45) Date of Patent: Nov. 23, 2010

(54) REVERSE PROXY PORTLET WITH RULE-BASED, INSTANCE LEVEL CONFIGURATION

(75) Inventor: Stanley Kieran Jerrard-Dunne, Leopardstown (IE)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 10/920,914

(22) Filed: Aug. 18, 2004

(65) Prior Publication Data

US 2006/0041637 A1 Feb. 23, 2006

(51) Int. Cl.
*G06F 15/16* (2006.01)

(52) U.S. Cl. ..................................... 709/246
(58) Field of Classification Search ............ 370/395.54, 370/468; 707/10; 709/219, 225, 250; 715/207, 715/234, 241, 733, 742; 717/106, 118, 168
See application file for complete search history.

(56) References Cited

U.S. PATENT DOCUMENTS

| | | | |
|---|---|---|---|
| 6,226,642 B1 * | 5/2001 | Beranek et al. ............... 707/10 |
| 6,654,807 B2 * | 11/2003 | Farber et al. ................ 709/225 |
| 6,732,105 B1 * | 5/2004 | Watson et al. ................ 707/10 |
| 6,987,987 B1 * | 1/2006 | Vacanti et al. ........... 455/556.2 |
| 7,107,309 B1 * | 9/2006 | Geddes et al. .............. 709/203 |
| 2002/0042727 A1 * | 4/2002 | Soramoto et al. .............. 705/4 |
| 2002/0052948 A1 * | 5/2002 | Baudu et al. ................ 709/224 |
| 2002/0099850 A1 * | 7/2002 | Farber et al. ................ 709/245 |
| 2002/0156905 A1 * | 10/2002 | Weissman .................... 709/229 |
| 2002/0184527 A1 * | 12/2002 | Chun et al. .................. 713/201 |
| 2003/0033434 A1 * | 2/2003 | Kavacheri et al. ........... 709/246 |
| 2003/0050834 A1 * | 3/2003 | Caplan ........................ 705/14 |
| 2003/0117437 A1 * | 6/2003 | Cook et al. .................. 345/764 |
| 2003/0120593 A1 * | 6/2003 | Bansal et al. ................. 705/39 |
| 2003/0126558 A1 * | 7/2003 | Griffin ........................ 715/513 |
| 2003/0145275 A1 * | 7/2003 | Qian et al. ................... 715/500 |
| 2003/0167298 A1 | 9/2003 | Bazinet et al. |
| 2003/0167315 A1 * | 9/2003 | Chowdhry et al. .......... 709/218 |
| 2004/0002978 A1 * | 1/2004 | Wookey et al. ............... 707/10 |
| 2004/0010621 A1 * | 1/2004 | Afergan et al. .............. 709/247 |

(Continued)

OTHER PUBLICATIONS

Orbeon. URL Rewriting. 2003. http://www.orbeon.com/oxf/doc/reference-url-rewriting pp. 1-5.*

(Continued)

*Primary Examiner*—John Follansbee
*Assistant Examiner*—Imad Hussain
(74) *Attorney, Agent, or Firm*—David A. Dagg

(57) ABSTRACT

A portal server having a reverse proxy mechanism for proxying one or more Web applications on a backend server in response to a request for Web content from a user. The reverse proxy mechanism includes a portlet, a set of configuration rules, and a rewriting mechanism. The rewriting mechanism is configured to forward a user request for Web content to a Web application on the backend server, receive a response from the Web application, and rewrite the received response in accordance with the configuration rules. The portlet is configured to produce a content fragment for a portal page from the rewritten response. The configuration rules include rules for rewriting any resource addresses, such as URLs, appearing in the received response from the Web application to point to the portal server rather than to the backend server.

22 Claims, 4 Drawing Sheets

U.S. PATENT DOCUMENTS

| | | | |
|---|---|---|---|
| 2004/0049579 A1* | 3/2004 | Ims et al. | 709/225 |
| 2004/0090969 A1* | 5/2004 | Jerrard-Dunne et al. | 370/395.54 |
| 2004/0104931 A1* | 6/2004 | Schmitt | 345/744 |
| 2004/0181598 A1* | 9/2004 | Paya et al. | 709/227 |
| 2004/0183831 A1* | 9/2004 | Ritchy et al. | 345/762 |
| 2004/0193699 A1* | 9/2004 | Heymann et al. | 709/218 |
| 2004/0225752 A1* | 11/2004 | O'Neil et al. | 709/246 |
| 2005/0065913 A1* | 3/2005 | Lillie et al. | 707/3 |
| 2005/0108732 A1* | 5/2005 | Musson et al. | 719/328 |
| 2005/0256808 A1* | 11/2005 | Allamaraju et al. | 705/67 |
| 2006/0015594 A1* | 1/2006 | Kontamsetty et al. | 709/221 |
| 2006/0069920 A1* | 3/2006 | Jolley | 713/182 |
| 2006/0195816 A1* | 8/2006 | Grandcolas et al. | 717/101 |
| 2006/0230062 A1* | 10/2006 | Roy-Chowdhury et al. | 707/103 X |
| 2007/0091871 A1* | 4/2007 | Taha | 370/352 |
| 2007/0277235 A1* | 11/2007 | Barrett et al. | 726/12 |

OTHER PUBLICATIONS

Hepper, Stefan et al. Best Practices: Developing portlets using JSR 168 and WebSphere Portal v5.02. Mar. 3, 2004. IBM. pp. 1-28. www.ibm.com/developerworks/cn/websphere/download/pdf/ $0403_{13}$ hepper-JSR168_BestPractices.pdf.*

Leue, Carsten. Portals, Portlets and Web Services for Remote Portlets. Feb. 10, 2003. IBM. pp. 1-23.*

"Module mod_rewrite URL Rewriting Engine" http://httpd.apache.org/docs/mod/mod_rewrite.html.

* cited by examiner

REVERSE PROXY PORTLET WITH RULE-BASED, INSTANCE LEVEL CONFIGURATION

FIELD OF THE INVENTION

The present invention relates generally to the field of data processing, and in particular to a reverse proxy system and method.

BACKGROUND OF THE INVENTION

The World Wide Web is the Internet's multimedia information retrieval system. In the Web environment, client machines communicate with Web servers using the Hypertext Transfer Protocol (HTTP). The Web servers provide users with access to files such as text, graphics, images, sound, video, etc., using a standard page description language known as Hypertext Markup Language (HTML). HTML provides basic document formatting and allows the developer to specify connections known as hyperlinks to other servers and files. In the Internet paradigm, a network path to a server is identified by a resource address called a Uniform Resource Locator (URL), and having a special syntax for defining a network connection. So-called Web browsers, for example, Netscape Navigator® (Netscape Navigator is a registered trademark of Netscape Communications Corporation) or Microsoft® Internet Explorer® (Microsoft and Internet Explorer are trademarks of Microsoft Corporation), which are application programs running on client computer systems, enable users to access information by specification of a link via the URL and to navigate between different HTML pages.

When the user of the Web browser selects a link, the client machine issues a request to a naming service to map a hostname (in the URL) to a particular network IP (Internet Protocol) address at which the server machine is located. The naming service returns an IP address that can respond to the request. Using the IP address, the Web browser establishes a connection to the server machine. If the server machine is available, it returns a Web page. To facilitate further navigation within the site, a Web page typically includes one or more hypertext references ("HREF") known as "anchors" or "links".

A "portal" is a Web application which arranges Web content into a portal page containing one or more "portlets". A portlet is a Web component, managed by a portlet software container, which processes and generates dynamic Web content. This content, often called a fragment, can be aggregated by the portal with content from other portlets to form the portal page. The content generated by a portlet may vary from one user to another depending on the user configuration for the portlet. A portal can act as a gateway to one or more backend software applications and be provided on a separate portal server. The portal can be used to deliver customized application content, such as forums, search engines, email and other information, within a standard template and using a common user interface mechanism. Users can be offered a single, personalized view of all the backend applications with which they work and can obtain access to a plurality of those backend applications through a single security sign-on.

Web clients interact with portlets via a request/response paradigm implemented by the portal. Normally, users interact with content produced by portlets, for example by submitting forms or following links, resulting in portlet action requests being received by the portal which are forwarded by it to the portlets targeted by the user's interactions.

A portal server used to provide a client with access to backend applications is disclosed in United States Patent Application 2003/0167298, which is incorporated herein by reference. The portal server is positioned in a Demilitarized Zone (DMZ), between a pair of firewalls and implements authentication of the client and checking of access privileges of the client. If the client is authorized, it will be allowed to access the backend applications.

For further improved security, reverse proxy (also called IP-forwarding) topologies may be used. These use a reverse proxy server to represent a secure content server to outside clients. Outside clients are not allowed to access the content server; their requests are sent to the reverse proxy server instead, which then forwards the client requests to the content server. The content server, which may be a portal server, forwards the requests to the applications or application servers for processing. The reverse proxy server returns the completed request to the client whilst hiding the identity of the portal and application servers from the client. This prevents the outside clients from obtaining direct, unmonitored access to the real content server.

Reverse proxy servers require significant configuration in order to correctly serve applications. Moreover, the reverse proxy server may only be used for applications that have been developed with reverse proxying in mind, for example only for applications in which all links to files on a Web or portal server do not refer to the full host name. Further, using a reverse proxy server, it is not possible to change the configuration rules for a particular application—there is just one set of rules for all applications being reverse proxied by that server. Thus, by changing the rules for one application, the rules are changed for all applications. Additionally, reverse proxy servers cannot cope with the dynamic creation of Hypertext References (HREFs), for example by JavaScript™, or the parameterization of applets.

Thus there exists a need for a system which addresses the above mentioned problems.

SUMMARY OF THE INVENTION

According to a first aspect of the present invention, there is provided a reverse proxy mechanism for proxying one or more Web applications on a Web server in response to a request for Web content from a client computer system. The disclosed reverse proxy mechanism includes a portlet, a set of configuration rules, and a rewriting mechanism, and is configured to forward data, relating to a client request for Web content, to a Web application on the Web server; receive a response from the Web application, and to rewrite the received response in accordance with the configuration rules, such that resource addresses contained within the response are rewritten to refer to the portal server rather than the Web server, and the portlet being configured to produce a content fragment for a portal page from the rewritten response.

According to a second aspect of the present invention, a portal server is disclosed including multiple portlets for processing Web content, and a portlet container for managing the portlets. At least one of the portlets has a set of configuration rules, and an associated servlet, and is configured to forward data, relating to a client request for Web content, to a Web application on a Web server, receive a response from the Web application, and rewrite the received response in accordance with the configuration rules such that resource addresses contained within the response are rewritten to refer to the portal server rather than the Web server. The portlet is configured to produce a content fragment for a portal page from the rewritten response.

According to a third aspect of the present invention, a method for reverse proxying a Web application on a Web server is disclosed. The disclosed method includes the steps of providing a portal server having a reverse proxy mechanism including a portlet, a set of configuration rules and a rewriting mechanism, receiving at the portal server a response from the Web server, the response including Web content requested by a client system, rewriting the response in accordance with the configuration rules such that resource addresses, such as URLs, contained within the response are rewritten to refer to the portal server rather than the Web server, and the portlet producing a content fragment for a portal page from the rewritten response.

The configuration rules include rules identifying a plurality of target character patterns and associated output models, and rewrite any URLs in the response by searching the response from the Web server for a character string corresponding to any of the target character patterns and rewriting any matched character strings in the response in accordance with the output model associated with the matched character pattern.

The disclosed system provides a reverse proxy mechanism incorporated into a portlet. As a result, no reverse proxy server is required, and the reverse proxy mechanism can be configured specifically for a backend application, thus enabling the disclosed system to be used even with applications which may not have been compatible with a reverse proxy server.

The disclosed system provides a portlet that acts like a reverse proxy server, allowing the portal server to appear to the client as the real content server. The portal server is arranged such that an external Web application, which is running on a separate backend server, appears within the boundary of the portlet. The backend server remains behind a firewall and the reverse proxy function of the portlet allows a user to access the Web application on the portal. Thus a user appears to obtain access to a backend application without being given access to the backend server itself.

A portlet developer can use portal administration tools to produce multiple copies of a portlet, each with a different configuration, and thus configuration on a per portlet basis is allowed to enable reverse proxying of different applications. This results in a significant reduction in overhead compared to configuring a single server to handle a multitude of applications. Moreover, there is much greater flexibility, as changes can be made to the configuration of one portlet, without affecting the configuration of (and thus handling of a particular application by) another portlet. In fact, each application being reverse proxied could be handled by a different portlet having a configuration appropriate to that application.

The portlet of the disclosed system resides in the same security zone as the portal server which also reduces administration overhead because there is no requirement to secure a separate server: secure the portal server and the backend system is safe.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

In the following description, reference is made to the accompanying drawings which form a part hereof and which illustrate one implementation. It is understood that other implementations may be utilized and structural and operational changes may be made without departing from the scope of the invention.

Figure 1:
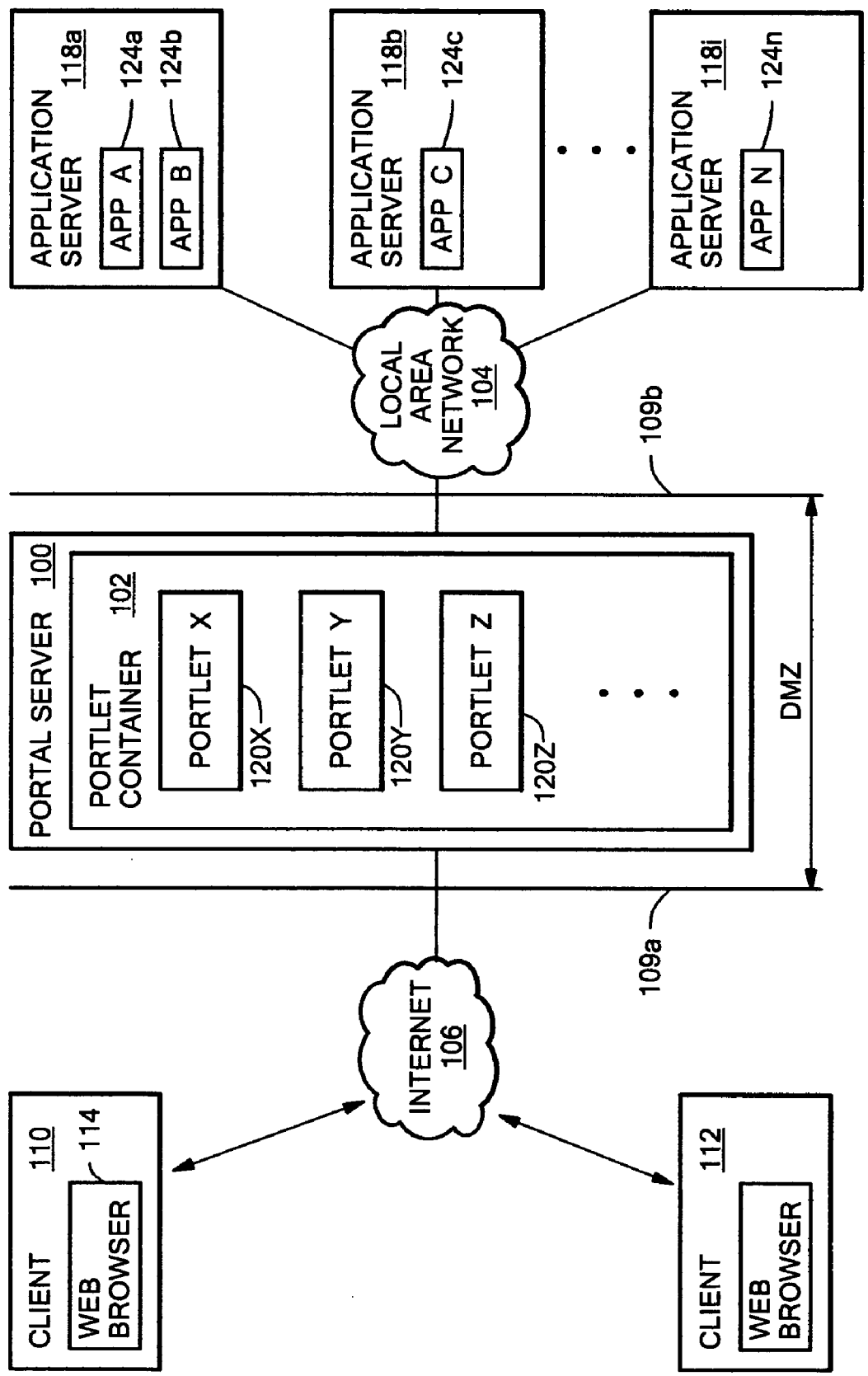
FIG. 1 illustrates an example of a computing environment using a reverse proxy mechanism according to an embodiment of the invention.

FIG. 1 illustrates a block diagram of a computing environment including an implementation of the invention. A portal server 100 comprises a portlet container 102 which manages a plurality of portlets 120X, 120Y, 120Z . . . , and connects to two networks 104 and 106. It should be understood that portal server 100, clients 110, 112 and application servers 118a, . . . 118i comprise any type of device capable of accepting input, providing output, and communicating with another device. To this extent, portal server represents any type of computerized system for providing access to a Web site (e.g., a Web server computer system), client systems 110, 112 represent any type of computerized system that can be used to access a computer network such as the world wide Web (e.g., a mobile phone, a handheld computer, a personal digital assistant, a portable (laptop) computer, a desktop computer, a workstation, a mainframe computer etc.), and application servers 118a, . . . 118i represent any type of computerized system for providing data to other systems. Communications between client systems, application servers, portal server, and/or networks can occur via any combination of wire line and/or wireless transmission methods. As depicted in FIG. 1, network 104 is a local area network and network 106 is the Internet, however each could be another type of network, including for example Ethernet, wide area network (WAN), local area network (LAN), virtual private network (VPN), or other private network. For simplicity, only two client systems are shown, but it will be appreciated that any number of clients could connect to network 106.

Portal server 100 is located within a demilitarized zone (DMZ). The DMZ allows the portal server 100 to host Internet services but at the same time prevents unauthorized access to the network 104 via Internet connections to the portal server 100. In addition to the use of firewalls 109a and 109b, extra security is provided by the use of one or more reverse proxy mechanisms which will be described below.

Backend systems 118a, 118b, . . . 118i connect to portal server 100 via the LAN 104. Each of the backend systems 118a, 118b, . . . 118i contains one or more backend application(s) [A, B, . . . , N] 124a, . . . , 124n. As shown in FIG. 1, backend system 118a, contains two backend applications 124a and 124b; backend system 118b contains one backend application 124c; and backend system 118i contains one backend application 124n. The backend systems, 118a, . . . 118i, may be any computational device such as a personal computer, a workstation, a server-class computer, a mainframe, a laptop, hand-held, palm-top or telephony device. The backend applications, 124a, . . . 124n, may be any server-based software application such as Web-based electronic mail, an instant messenger application, a server-based spreadsheet, a database application etc.

The portal server 100 may be, for example, a WebSphere® Portal Server (Registered Trade Mark of International Business Machines Corp. of Armonk, N.Y.), which arranges Web content into a portal page containing one or more portlets. Each portlet includes a section of Web content specified according to a user's preferences. For example, a user can establish his/her own portal page that has portlets for news, weather, sports email etc. Several de-facto standards exist for writing portlets. Among these are WebSphere® Portal Server and the Java Specification Request (JSR)-168 Standard.

Clients 110 and 112 can connect to the portal server 100 through the network 106 via the hypertext transfer protocol (HTTP) from Web browsers 114, 116. For example, Web browser 114 may send a HTTP request to the portal server 100 across the Internet 106. When the request is received by the portal server 100, it determines if the request contains an action targeted to any of the portlets associated with the portal page and creates a list of portlets that need to be executed to satisfy the request. The portal server 100 requests the portlet container 102 to invoke the portlets to process the action. At least one portlet processes the action, and each invoked portlet generates a content fragment to be included in the new portal page. The portal server aggregates the output of the portlets in the portal page and sends the portal page back to the client 110. The Web browser 114 on the client 110 renders the Web page for display to a user.

Figure 2:
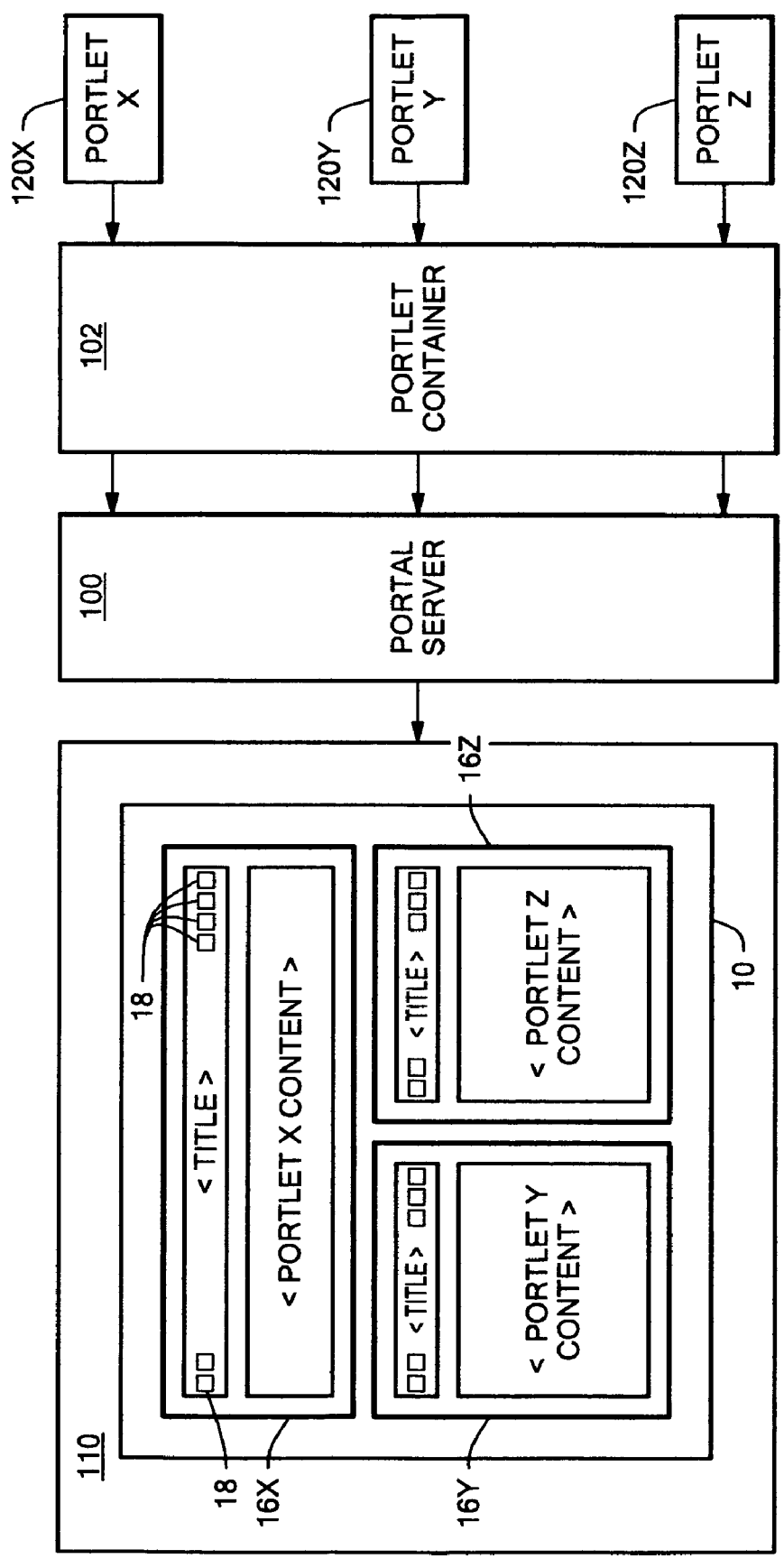
FIG. 2 illustrates an example of portal page creation.

FIG. 2 shows an example of a displayed portal page 10 and the process of its creation. The portlet container 102 receives content from each portlet 120$x$, 120$y$, 120$z$, . . . , and hands the content to the portal server 100. The portal server 100 packages each portlet content fragment in a portlet window 16$x$, 16$y$, 16$z$, adding a title and control buttons 18, and then aggregates the portlet windows into a complete portal page 10 for rendering by a Web browser on the client 110.

Portlets known as 'concrete' portlets can have multiple instances. That is, the same concrete portlet can be used in many places, e.g. by different users, providing shared configuration. Additionally, a portlet developer can use portal administration tools to produce multiple copies of a portlet and then modify the configuration of each portlet to provide multiple concrete portlets, each with a different configuration. This allows configuration on a per concrete portlet basis to enable reverse proxying of different applications having different configuration requirements. Changes can be made to the configuration of one concrete portlet, without affecting the configuration of (and thus handling of a particular application by) another concrete portlet.

In the table below there are shown two concrete portlets each with a unique set of configuration rules, as well as a number of instances of each concrete portlet, whereby portlet instances 1$a$ and 1$b$ share a configuration, Configuration 1, and portlet instances 2$a$, 2$b$ and 2$c$ share Configuration 2.

| Concrete portlet 1 | Configuration 1 | Portlet instance 1a |
| | | Portlet instance 1b |
| Concrete portlet 2 | Configuration 2 | Portlet instance 2a |
| | | Portlet instance 2b |
| | | Portlet instance 2c |

A portlet's different instances can be selected by a user for display using the control buttons 18. Additionally, the portlet has a number of different modes which can be selected. Some of these modes are available only to a portlet developer or system administrator.

The normal mode of operation of a portlet is the View mode, which is how the portlet is usually initially displayed to a user. A portlet may also support a Help mode, which may provide a help page to enable users to obtain more information about the portlet, and an Edit mode, which lets a user customize and change the content of the portlet. In the Configuration mode of the portlet 12$c$, a portal developer or administrator can alter the configuration rules of the portlet.

Client requests are usually triggered by URLs created by the portlets and called portlet URLs. A portlet URL is targeted to a particular portlet. There are two types of portlet URLs—action URLs and render URLs. Normally, a client request triggered by an action URL translates into one action request for the targeted portlet followed by many render requests—one per portlet in the portal page. A client request triggered by a render URL translates into many render requests—one per portlet in the page. Typically, in response to an action request a portlet updates its state based on the information sent in the action request parameters. The portlet may change its mode or window state, or instruct the portal server to redirect the user to a specific URL, for example. During a render request portlets generate content based on their current sate.

One or more of the portlets 120$x$, 120$y$, 120$z$ may be used in a reverse proxy mechanism 150 of the present invention, which will be explained below with reference to FIG. 3. The portal server 110 and reverse proxy mechanism 150 may be implemented in any programming language such as Java™, C++ etc. The Web pages sent by the portal server 100 to the clients 110 and 112, and the requests and responses sent to and received from the backend Web applications, may include code in Active Server Pages (ASP), Java™ server pages, Hypertext Markup languages (HTML), Extensible Markup Language (XML) etc.

Figure 3:
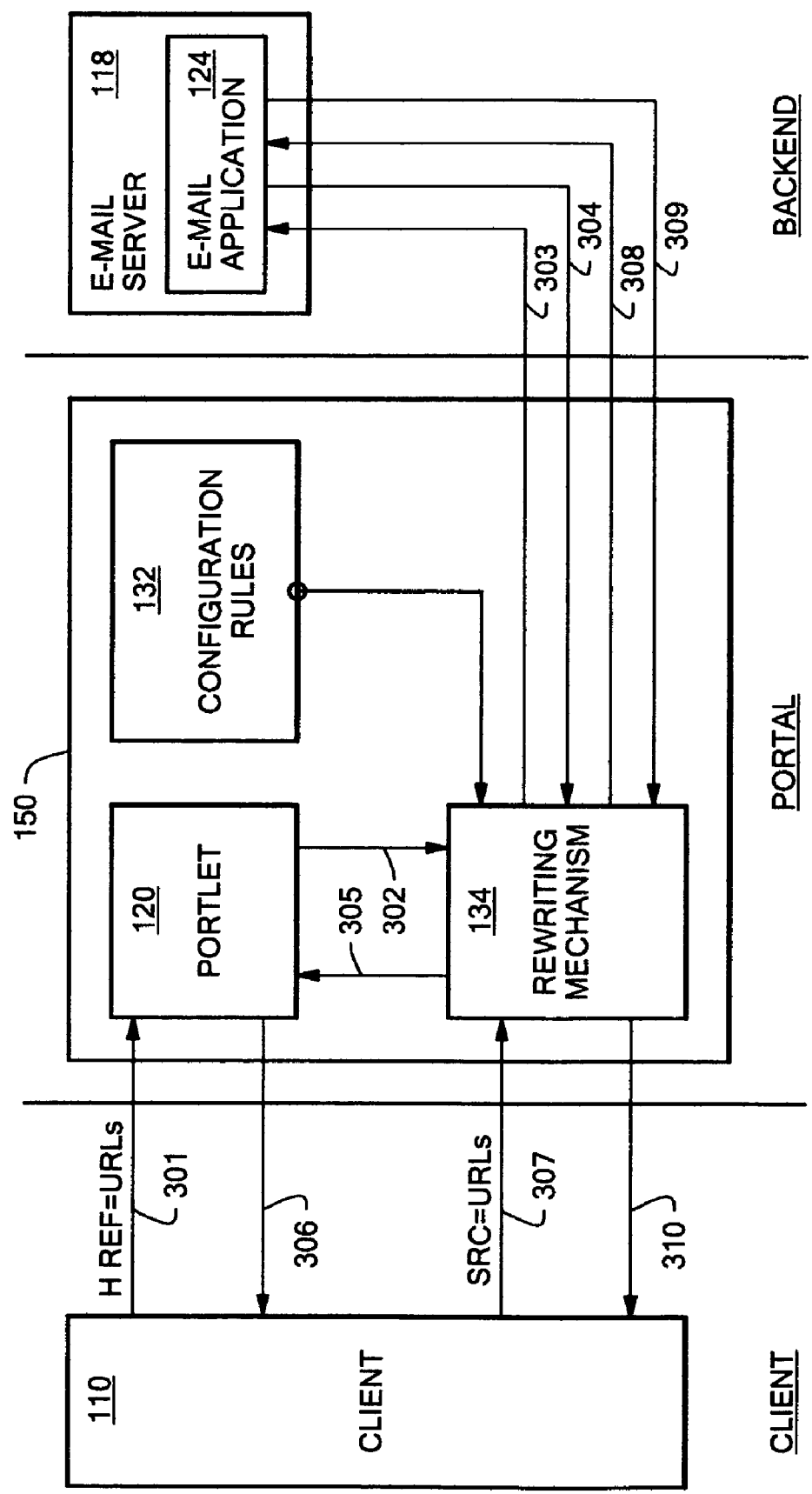
FIG. 3 illustrates a reverse proxy portlet request flow in accordance with one embodiment of the invention.

Referring to FIG. 3, the functional components of a reverse proxy mechanism 150 according to a preferred embodiment of the invention will now be described. For ease of reference some components of the system have been omitted. The reverse proxy mechanism 150 comprises a portlet 120 for producing content fragments for one or more portlet instances, a set of configuration rules 132, and a rewriting mechanism 134.

The portlet 120 forwards requests to the rewriting mechanism 134 and forwards responses from the backend application (received via the rewriting mechanism) to the portal server 100 for aggregation into a portal window and portal page.

The rewriting mechanism 134 may, for example, be a J2EE servlet (i.e. Java 2 Enterprise Edition, Trade Mark of Sun Microsystems Inc) invoked by the portlet and which comprises the code for carrying out the reverse proxy transformation of messages in dependence on the configuration rules, sharing this code with the portlet 120 when necessary. The rewriting mechanism searches through the whole text of a response received from a backend application for any character string which corresponds correctly with any of the Regular Expression patterns listed in the configuration rules 132. If a character string corresponds correctly to one of the Regular Expression patterns in the configuration rules we can say there is a 'match', and the rewriting mechanism applies the corresponding 'Output Model' from the rule containing the Regular Expression, and which defines how the matching character string is to be rewritten. The servlet also provides a mechanism for addressing the portlet without refreshing the portal page each time as will be described later.

As it is generally known, in computer programming, a "regular expression" is a formal expression of a string pattern which can be searched for and processed by a pattern-matching program. The method of determining which patterns should be rewritten used by the disclosed rewriting mechanism may based on regular expression pattern matching, in which certain characters, such as ".", "*" and "?", for example, may be used to represent wild card characters or wild card character strings. Alternatively, any other specific technique for specifying patterns to be rewritten may be used, including pattern lists, or other techniques. The disclosed system may be embodied using a regular expression processing software package. One such regular expression package is provided through The Apache Jakarta Project, and described on the Web at http://jakarta.apache.org/regexp. An example of a matching pattern for a regular expression, triggering application of a corresponding Output Model, will now be explained.

Given an input string:

<A href="/mail/adunne.nsf/($Inbox)?Openview">Inbox</A>

This input character string matches one of multiple target character patterns defined by the regular expression:

href="(.*?)"

The portion of the input character string "/mail/adunne.nsf/($Inbox)?Openview", matches the pattern "(.*?)" according to wild card character rules. As a result of this match, an Output Model corresponding to the regular expression will be applied to modify ("rewrite") at least a portion of the input string. For example, each configuration rule may include a regular expression, and a corresponding Output Model to be applied to input character strings matching the regular expression. The Output Model defines a substitute output pattern that is to replace, in whole or in part, the input strings that match the corresponding regular expression in the configuration rule. The substitute output pattern may be literally or logically represented in the Output Model. An example of an Output Model for this above regular expression is:

href="@proxyhrefurl(1)"

In the exemplary embodiment, the "/mail/adunne.nsf/($Inbox)?Openview" portion of the matching character string becomes the argument "(1)" of the above Output Model corresponding to the above regular expression. Each Output Model indicates how a matching character string is to be rewritten, providing either a literal or logical representation of substitute characters or character strings. In this example, the "@proxyhrefurl" portion of the Output Model is a logical representation of the name of a proxy server (e.g. "myportal/sproxy") that is to be pre-pended to the matching character string (before the argument (1)). The resulting rewritten character string is thus:

<A ref="myportal/sproxy/mail/adunne.nsf/($Inbox)?OpenView">Inbox</A>

Thus the above result is a link to a document on the proxy portal server, rather than to the email server.

The configuration rules of the reverse proxy mechanism 150 are defined to rewrite URLs contained within the intercepted content in order to ensure that subsequent requests are directed to the portal as opposed to the backend server. In addition, the rules may affect other elements of the intercepted content for example to ensure that URLs or scripted functions do not take the user's browser outside the context of the portlet. Thus the disclosed rules can be used to manipulate and maintain a particular user interface. For example, code which instructs a browser to render text at the top of a Web page may be rewritten to instruct the browser to render the text at the top of a portlet window on the page, so that the text remains within a user's view of a particular portlet, rather than taking over the whole page.

In the Configuration mode of the portlet in a reverse proxy mechanism according to a preferred embodiment, a developer will be presented with a table showing the various configuration rules which are applied by the reverse proxy mechanism and is able to edit these. The table of rules includes a list of Regular Expression patterns, which can be used to identify matching patterns of code or character strings, each Regular Expression pattern having a corresponding 'Output Model' which defines how a matched pattern of code or character string is to be rewritten. Changes made to the configuration rules change all instances of the portlet. The rules may indicate whether or not the search for each Regular Expression pattern in the received content is case sensitive.

Examples of some configuration rules of the portlet include rules to transform HREF links, codebase links, action links and browser side redirection URLs. Additionally the rules can specify the transformation of applet parameter values. Applets often include parameters which indicate a server on which an image which the applet displays can be found. The rules can manipulate these to ensure that these do not refer to the backend Web server.

As the configuration rules can be scoped to a particular backend application (or to a plurality of particular backend applications), several instances of a portlet may exist; specializations can be made to address specific concerns of that (those) application(s) allowing flexibility without the risk of breaking other applications. Thus, in many cases, the present invention allows reverse proxying for applications which were not originally developed with reverse proxying in mind.

As has been mentioned previously, to facilitate navigation within a Web site, a Web page typically includes one or more hypertext references ("HREF") known as "anchors" or "links". These references are to a whole Web page and requesting one of these URLs refreshes the whole portal page and all portlets on the page receive a render request and will be rebuilt even if they are not affected by the client action. Links to images or frames within the Web page are specified by the attribute "SRC". To speed up the process of rendering a Web page, browsers often request the text of the page first and then download the images later. The reverse proxy mechanism of one embodiment treats 'SRC=URL' requests for graphics differently to 'HREF=URL' requests for a full page. This is achieved by rewriting the URLs sent to a client to point to the portlet for HREF URLs and directly to the rewriting mechanism for SRC URLs. Examples of the two request flows will now be described.

The request flow for an HREF hypertext link will now be described with reference to request flows 301 to 306 of FIG. 3 in the context of an example in which a client system 110 displays a portal page including a portlet which displays content generated by an email application 124 which is running on a backend email server 118. When the user logs on to the portal, the user's portal homepage will usually be displayed to the user. The email portlet will show a default view of the user's mailbox—typically an Inbox. This includes a list of emails received by the user, typically listing the subject or sender of the email as a hypertext link on which the user can click to request the full text of the email. When a user clicks on a link to the full text of an email, a request 301 for the email message is sent to the portal server. The portal server passes the request to the portlet 120 of the reverse proxy mechanism 150. The portlet 120 invokes the servlet 134 and passes the request 302 to the servlet 134, which forwards 303 the request to the email server 118.

The email application 124 services the request and sends a reply 304 to the servlet 134. The servlet 134 rewrites the reply in accordance with the configuration rules 132 by searching through the whole text of the response for any character string which matches any of the Regular Expression patterns listed in the configuration rules 132. For any match found, the rewriting mechanism substitutes the matched text with the corresponding output character string and then passes the rewritten reply 305 to the portlet 120 which passes this as its fragment to the portal server for aggregation with content from other portlets into the requested portal page which is then returned 306 to the client. The portal page passed back to the client may include HREF URLs to the portlet, but any SRC URLs will have been rewritten so as to refer to the servlet 134. Thus when the client sends a request 307 for an image, that is if the request URL has the SRC attribute, the portal server passes the request directly to the servlet 134, bypassing the portlet 120. The servlet then passes the graphics request 308 to the email server 118. The email application 124 services the request and sends a response 309 to the servlet 134, which rewrites any content of the response matching a Regular Expression Pattern in the set of configuration rules 132 of the portlet. The rewritten response is then sent 310 to the client system from the servlet 134. By bypassing the portlet, the whole of the portlet page need not be refreshed each time a graphic image is pulled from the mail server to fill a document in the portal page.

Some backend applications, such as Domino™ email applications, use Web pages that are set up in frames, with a frameset which determines the size and shape of the frames and URLs used to point to the source of the data required to fill the frames. Thus to work with a Domino email application, or any other frame based application, a portal server must be configured to manage frames.

A portal page comprising a plurality of portlets is typically arranged in an HTML table. Such a table does not support frames as it does not use a frameset and thus it is not possible to display a frame directly in a cell of the table. It has been appreciated that this problem may be overcome by using inline frames (also called floating frames or iframes). An inline frame is a construct which embeds a document into an HTML document so that embedded data is displayed inside a sub-window of the browser's window. The two documents are independent and are treated as complete, separate documents, rather than one as being part of the other.

Figure 4:
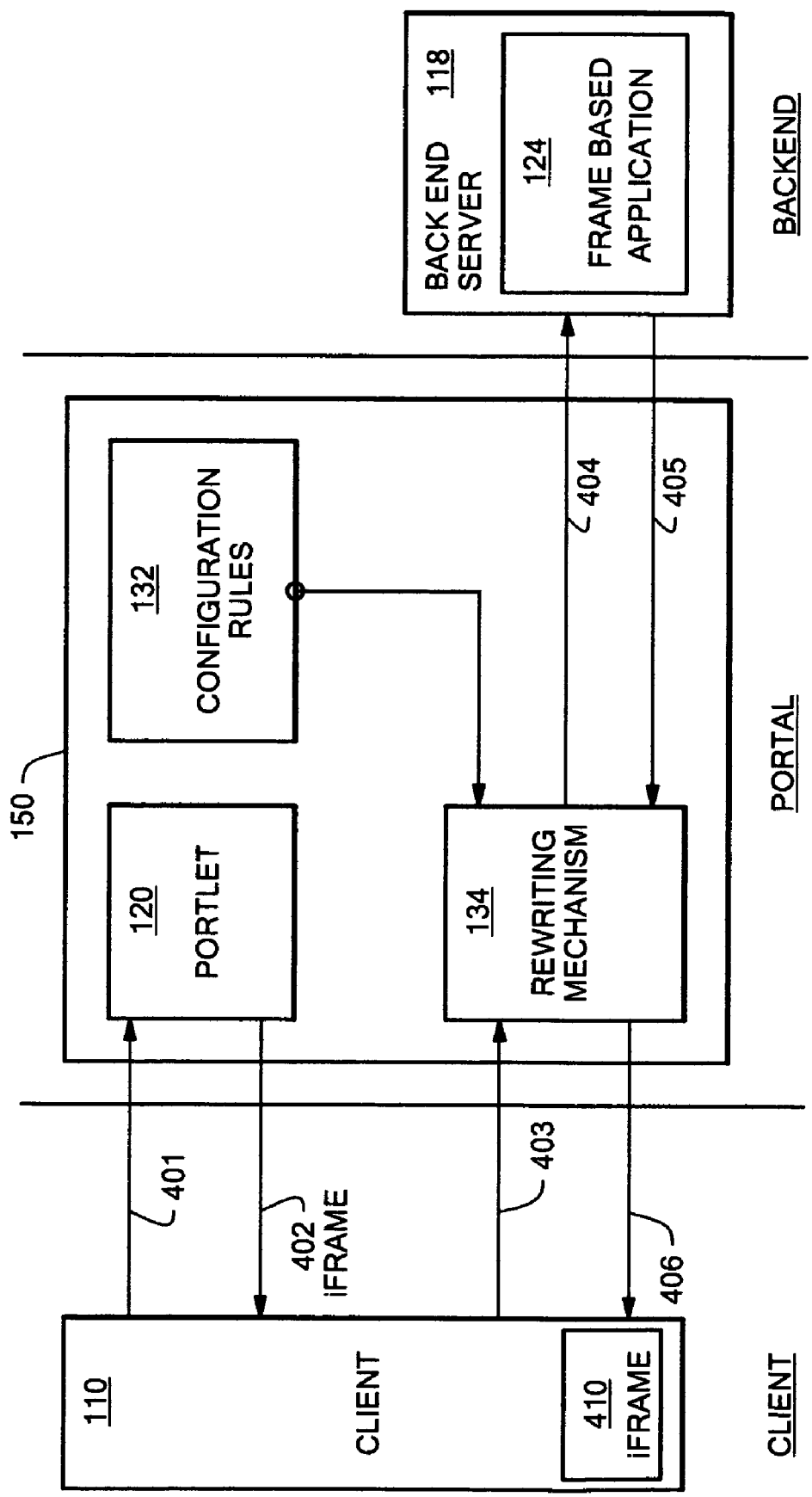
FIG. 4 illustrates a modified reverse proxy portlet request flow with an iframe option selected.

Referring to FIG. 4, when a user requests 401 a Web page, such as the user's email Inbox, the portlet 120 creates an iframe 402 which it sends to the portal server as its content fragment for aggregation into the portal page. The iframe includes a link directing the client to contact the servlet 132 for content to fill the iframe. The client renders the iframe 410 and requests content for the iframe from the servlet 403, which requests 404 and receives 405 the necessary content from the server 118. The servlet 134 applies the configuration rules 132 to the message received from the application 124 and rewrites any matched patterns accordingly, as described above. The servlet 134 then sends 406 the rewritten response to the client, which then fills the iframe 410 accordingly.

The reverse proxy mechanism of the preferred embodiment thus provides a secure and more convenient method of providing Web content from backend servers such as a Domino server, and improves significantly on the systems of the prior art. In particular, preferred embodiments provide a portlet that acts like a reverse proxy server and allows configuration on a per portlet basis. This significantly reduces the overhead of configuring a separate server to handle all applications. The disclosed system enables backend applications which uses frames to be reverse proxied and as the portlet (or portlets) resides in the same security zone as the portal server the administration overhead is reduced because there is no requirement to secure a separate server: secure the portal server and the backend system is safe.

It will be understood by those skilled in the art that, although the present invention has been described in relation to the preceding example embodiments, the invention is not limited thereto and that there are many possible variations and modifications which fall within the scope of the invention. In particular, whilst the preferred embodiments have been described with reference to email applications, the present invention may similarly be applied to other Web applications, relating to, for example, news, sport, finance, weather, travel etc. Additionally, the portal server may comprise a plurality of reverse proxy mechanisms. Each reverse proxy mechanism may be configured to reverse proxy a different set of one or more backend application(s) running on one or more backend server(s), with the configuration rules of each reverse proxy mechanism being modified according to its particular set of backend applications.

FIGS. 1-4 are block diagram and flowchart illustration of methods, apparatus (s) and computer program products according to an embodiment of the invention. It will be understood that each block of FIGS. 1-4, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the may be embodied using a variety of specific command structures. Accordingly, the invention should not be viewed as limited except by the scope and spirit of the appended claims.

I claim:

1. A computer implemented method of providing a portal page from a portal server to a client system, the portal server and the client system each including at least one processor, the portal page including Web content from an application on a Web server, the method comprising the steps of:
   providing a reverse proxy mechanism including a portlet, a set of configuration rules shared by each of a plurality of user selectable instances of the portlet on the portal server, and a rewriting mechanism on the portal server;
   receiving by the portal server a client request targeting the portlet;
   forwarding data relating to the request to the portlet;
   forwarding data relating to the request to a Web application on a Web server including at least one processor;
   receiving a response from the Web server;
   rewriting the response in accordance with the configuration rules such that resource addresses contained within the response are rewritten to refer to the portal server rather than the Web server, wherein the rewriting includes identifying resource addresses in requests for graphics and resource addresses in requests for full pages, rewriting the resource addresses in the requests for graphics with references to the rewriting mechanism on the portal server, and rewriting the resource addresses in the requests for full pages with references to the portlet on the portal server;
   the portlet producing a content fragment for a portal page from the rewritten response;
   packaging the content fragment into a portlet window, wherein the packaging includes adding control user interface objects to the content fragment within the portlet window outside the content fragment, the control user interface objects enabling a user to select which of the user selectable instances of the portlet is to be displayed within the portlet window; and
   aggregating the portlet window into a portal page.

2. A method according to claim 1, wherein the configuration rules identify a plurality of target character patterns and associated output models, and wherein the rewriting step further comprises:
   searching the response from the Web server for a character string corresponding correctly to any of the target character patterns and rewriting any matched character strings in the response in accordance with the output model associated with the matched character pattern.

3. A method according to claim 1, wherein the client request includes an indication of one or more user preferences and the portlet produces a content fragment in accordance with these user preferences.

4. A method according to claim 1, wherein the portal page comprises portlet windows containing content fragments from a plurality of portlets, the method further comprising the step of aggregating the portlet windows containing content fragments from each of the portlets into the portal page.

5. A computer-implemented method for reverse proxying a Web application on a Web server including at least one processor, the method comprising the steps of:
   providing on a portal server a reverse proxy mechanism comprising a portlet, a set of configuration rules shared by each of a plurality of user selectable instances of said portlet on said portal server, and a rewriting mechanism, wherein the portal server includes at least one processor;
   receiving at the portal server a response from the Web server, the response including Web content requested by a client system including at least one processor;
   rewriting the response in accordance with the configuration rules such that resource addresses contained within the response are rewritten to refer to the portal server rather than the Web server, wherein the rewriting includes identifying resource addresses in requests for graphics and resource addresses in requests for full pages, rewriting the resource addresses in the requests for graphics with references to the rewriting mechanism on the portal server, and rewriting the resource addresses in the requests for full pages with references to the portlet on the portal server;
   the portlet producing a content fragment from the rewritten response;
   packaging the content fragment into a portlet window, wherein the packaging includes adding control user interface objects to the content fragment within the portlet window outside the content fragment, the control user interface objects enabling a user to select which of the user selectable instances of the portlet is to be displayed within the portlet window; and
   aggregating the portlet window into a portal page.

6. The method of claim 5, wherein the configuration rules identify a plurality of target character patterns and associated output models and the step of rewriting comprises searching the response from the Web server for character strings corresponding correctly to any of the target character patterns and rewriting any matched character strings in the response in accordance with the output model associated with the matched character pattern.

7. The method of claim 5 further comprising intercepting by the portlet a user request for Web content from a Web application and forwarding the request to the Web application.

8. A reverse proxy mechanism for proxying, within a portal server computer system including at least one processor communicably coupled to a memory, one or more Web applications running on a Web server computer system, in response to a request for Web content from a client computer system, the reverse proxy mechanism within the portal server computer system comprising:
   a portlet;
   a set of configuration rules shared by each of a plurality of user selectable instances of said portlet on said portal server;
   a rewriting mechanism, said rewriting mechanism comprising program code for execution on said processor and stored in said memory, said rewriting mechanism configured to
      forward data, relating to a client request for Web content, to a Web application on the Web server,
      receive a response from the Web application,
      rewrite the received response in accordance with the configuration rules, such that resource addresses contained within the response are rewritten to refer to the portal server rather than the Web server, and the portlet being configured to produce a content fragment; and
   program code configured to
      package the content fragment into a portlet window, wherein the packaging includes adding control user interface objects to the content fragment within the portlet window outside the content fragment, the control user interface objects enabling a user to select which of the user selectable instances of the portlet is to be displayed within the portlet window, and
      aggregate the portlet window into a portal page.

9. A reverse proxy mechanism according to claim 8, wherein the configuration rules identify a plurality of target character patterns and associated output models, and the rewriting mechanism searches the response from the Web server for character strings corresponding correctly to any of the target character patterns and rewrites any matched character strings in the response in accordance with the output model associated with the matched character pattern.

10. A reverse proxy mechanism according to claim 8, wherein the client request includes an indication of one or more user preferences and the portlet is operable to render a content fragment from a rewritten response in accordance with these user preferences.

11. A reverse proxy mechanism according to claim 8, wherein the configuration rules also include rules for rewriting the response from the Web server to manipulate formatting characteristics of the Web content.

12. A reverse proxy mechanism according to claim 8, in which the rewriting mechanism is configured to rewrite resource addresses having the attribute 'href' to refer to the portlet and resource addresses having the attribute 'src' to refer to the rewriting mechanism.

13. A reverse proxy mechanism according to claim 8 wherein the rewriting mechanism is a servlet.

14. A reverse proxy mechanism according to claim 8 configured to respond to a client request for Web content from a Web application which uses a frameset, by creating an inline frame as a content fragment including a link to the rewriting mechanism.

15. A reverse proxy mechanism according to claim 14, configured to rewrite a response from the Web server to a client request to fill an inline frame, such that any resource addresses in the response refer to the rewriting mechanism rather than the Web server.

16. A non-transitory computer readable storage medium, the computer readable storage medium having stored thereon program code for providing a portal page from a portal server to a client system, the portal page including Web content from an application on a Web server, the program code stored on the computer readable storage medium comprising:

program code for providing a reverse proxy mechanism including a portlet, a set of configuration rules shared by each of a plurality of user selectable instances of said portlet on said portal server, and a rewriting mechanism on the portal server;

program code for receiving by the portal server a client request targeting the portlet;

program code for forwarding data relating to the request to the portlet;

program code for forwarding data relating to the request to a Web application on a Web server;

program code for receiving a response from the Web server;

program code for rewriting the response in accordance with the configuration rules such that resource addresses contained within the response are rewritten to refer to the portal server rather than the Web server, wherein the rewriting includes identifying resource addresses in requests for graphics and resource addresses in requests for full pages, rewriting the resource addresses in the requests for graphics with references to the rewriting mechanism on the portal server, and rewriting the resource addresses in the requests for full pages with references to the portlet on the portal server;

program code for, by the portlet, producing a content fragment for a portal page from the rewritten response;

program code for packaging the content fragment into a portlet window, wherein the packaging includes adding control user interface objects to the content fragment within the portlet window outside the content fragment, the control user interface objects enabling a user to select which of the user selectable instances of the portlet is to be displayed within the portlet window; and program code for aggregating the portlet window into the portal page.

17. A non-transitory computer readable storage medium according to claim 16, wherein the configuration rules identify a plurality of target character patterns and associated output models, and wherein the program code for rewriting step further comprises:

program code for searching the response from the Web server for a character string corresponding correctly to any of the target character patterns and rewriting any matched character strings in the response in accordance with the output model associated with the matched character pattern.

18. A non-transitory computer readable storage medium according to claim 16, wherein the client request includes an indication of one or more user preferences and the portlet produces a content fragment in accordance with these user preferences.

19. A non-transitory computer readable storage medium according to claim 16, further comprising:

program code for, by the portal server computer system, packaging the content fragment into a portlet window.

20. A non-transitory computer readable storage medium according to claim 16, wherein the portal page comprises content fragments from a plurality of portlets, and further comprising program code for aggregating the content fragments from each of the portlets into the portal page.

21. A reverse proxy mechanism for proxying, within a portal server computer system including at least one processor communicably coupled to a memory, one or more Web applications running on a Web server computer system, in response to a request for Web content from a client computer system, the reverse proxy mechanism within the portal server computer system comprising:

a portlet;

a set of configuration rules shared by each of a plurality of user selectable instances of said portlet on said portal server; and a rewriting means, said rewriting means comprising program code for execution on said processor and stored in said memory, said rewriting means configured to forward data, relating to a client request for Web content, to a Web application on the Web server, receive a response from the Web application, and rewrite the received response in accordance with the configuration rules, such that resource addresses contained within the response are rewritten to refer to the portal server rather than the Web server by rewriting resource addresses having the attribute 'href' to refer to the portlet and resource addresses having the attribute 'src' to refer to the rewriting mechanism, and the portlet being configured to produce a content fragment for a portlet window within a portal page from the rewritten response, the portlet window further including control user interface objects enabling a user to select which of the user selectable instances of the portlet is to be displayed.

22. The reverse proxy mechanism of claim 21, further comprising:

wherein the configuration rules identify a plurality of target character patterns and associated output models, and the rewriting mechanism searches the response from the Web server for character strings corresponding correctly to any of the target character patterns and rewrites any matched character strings in the response in accordance with the output model associated with the matched character pattern;

wherein the client request includes an indication of one or more user preferences and the portlet is operable to render a content fragment from a rewritten response in accordance with these user preferences;

wherein the configuration rules also include rules for rewriting the response from the Web server to manipulate formatting characteristics of the Web content;

wherein the rewriting mechanism is a servlet; and wherein the rewriting means is further configured to
respond to a client request for Web content from a Web application which uses a frameset, by creating an inline frame as a content fragment including a link to the rewriting mechanism, and rewrite a response from the Web server to a client request to fill an inline frame, such that any resource addresses in the response refer to the rewriting mechanism rather than the Web server.

\* \* \* \* \*